(12) United States Patent
Ikuno

(10) Patent No.: US 8,432,462 B2
(45) Date of Patent: Apr. 30, 2013

(54) IMAGE PROCESSING APPARATUS, IMAGE PROCESSING METHOD, PROGRAM, AND STORAGE MEDIUM

(75) Inventor: Takao Ikuno, Yokohama (JP)

(73) Assignee: Canon Kabushiki Kaisha (JP)

( * ) Notice: Subject to any disclaimer, the term of this patent is extended or adjusted under 35 U.S.C. 154(b) by 109 days.

(21) Appl. No.: 13/056,829

(22) PCT Filed: Jul. 24, 2009

(86) PCT No.: PCT/JP2009/063621
§ 371 (c)(1),
(2), (4) Date: Jan. 31, 2011

(87) PCT Pub. No.: WO2010/013791
PCT Pub. Date: Feb. 4, 2010

(65) Prior Publication Data
US 2011/0134277 A1 Jun. 9, 2011

(30) Foreign Application Priority Data
Jul. 31, 2008 (JP) ................................ 2008-198560

(51) Int. Cl.
*H04N 5/76* (2006.01)
(52) U.S. Cl.
USPC .................................. 348/231.6; 348/231.3
(58) Field of Classification Search ............... 348/231.1, 348/231.6, 231.3, 231.99
See application file for complete search history.

(56) References Cited

U.S. PATENT DOCUMENTS

| 6,912,531 | B1 | 6/2005 | Matsumoto et al. |
| 7,791,742 | B2 * | 9/2010 | Ohshima ...................... 358/1.1 |
| 2007/0297016 | A1 | 12/2007 | Ohshima |
| 2009/0207279 | A1 | 8/2009 | Ochi et al. |

FOREIGN PATENT DOCUMENTS

| JP | 2001-43239 A | 2/2001 |
| JP | 2001-313895 A | 11/2001 |
| JP | 2007-312097 A | 11/2007 |
| JP | 2008-5154 A | 1/2008 |
| WO | 2008/087914 A1 | 7/2008 |
| WO | 2010/013791 A1 | 2/2010 |

OTHER PUBLICATIONS

International Search Report issued in related PCT/JP2009/063621 mailed Aug. 25, 2009.

* cited by examiner

*Primary Examiner* — Tuan Ho
*Assistant Examiner* — Chan Nguyen
(74) *Attorney, Agent, or Firm* — Rossi, Kimms & McDowell LLP

(57) ABSTRACT

An image processing apparatus that enables to prevent waste of electric power, memory or the like by selecting image data that is highly significant for image processing from multiple pieces of image data contained in a single file and subjecting the image processing to image data. A reception section receives a file that contains multiple pieces of image data with attribute information added. A determination section determines whether or not a corresponding one of the pieces of image data is to be subjected to image processing based on the attribute information contained in the file received by the reception section.

13 Claims, 13 Drawing Sheets

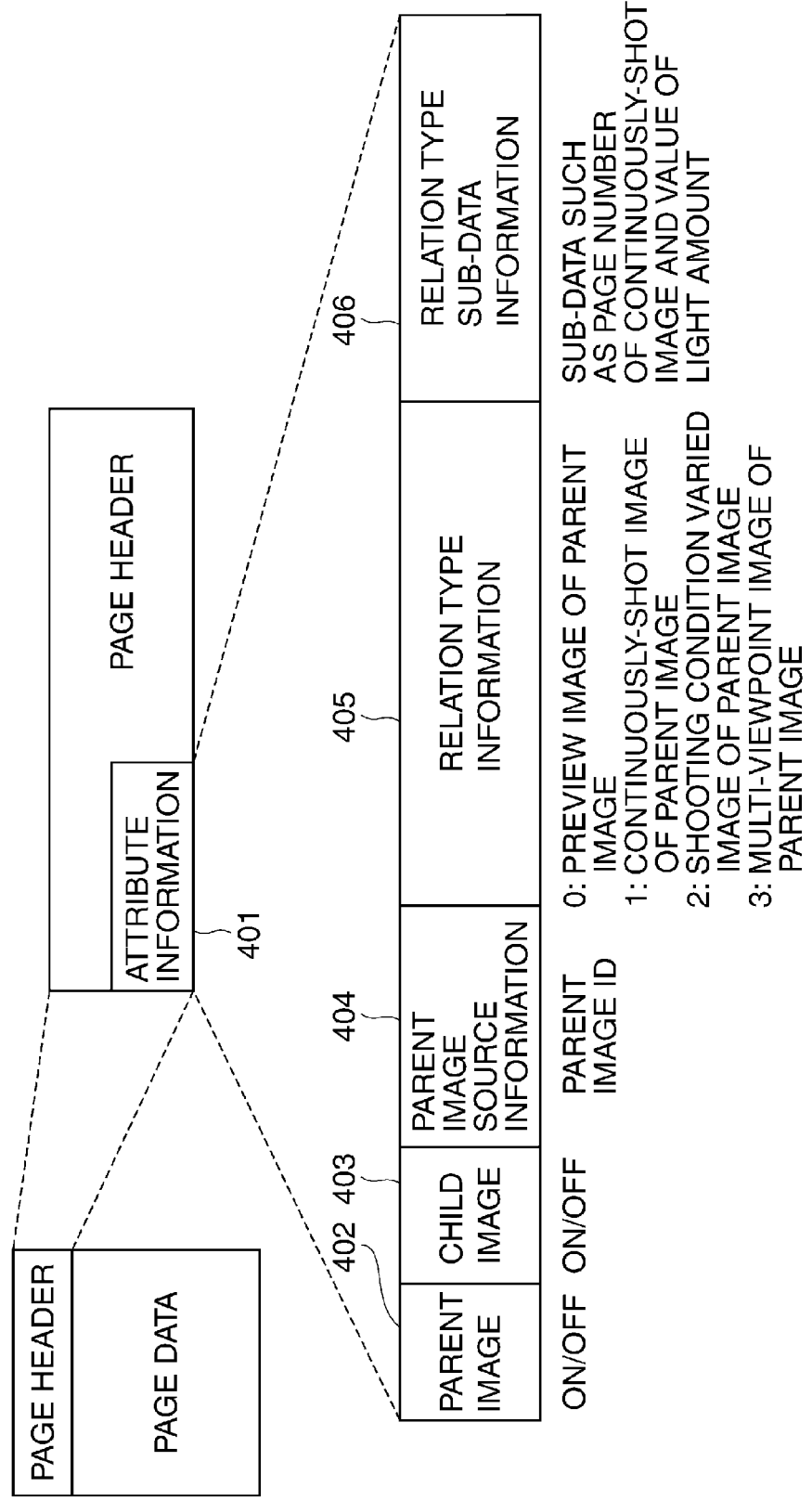

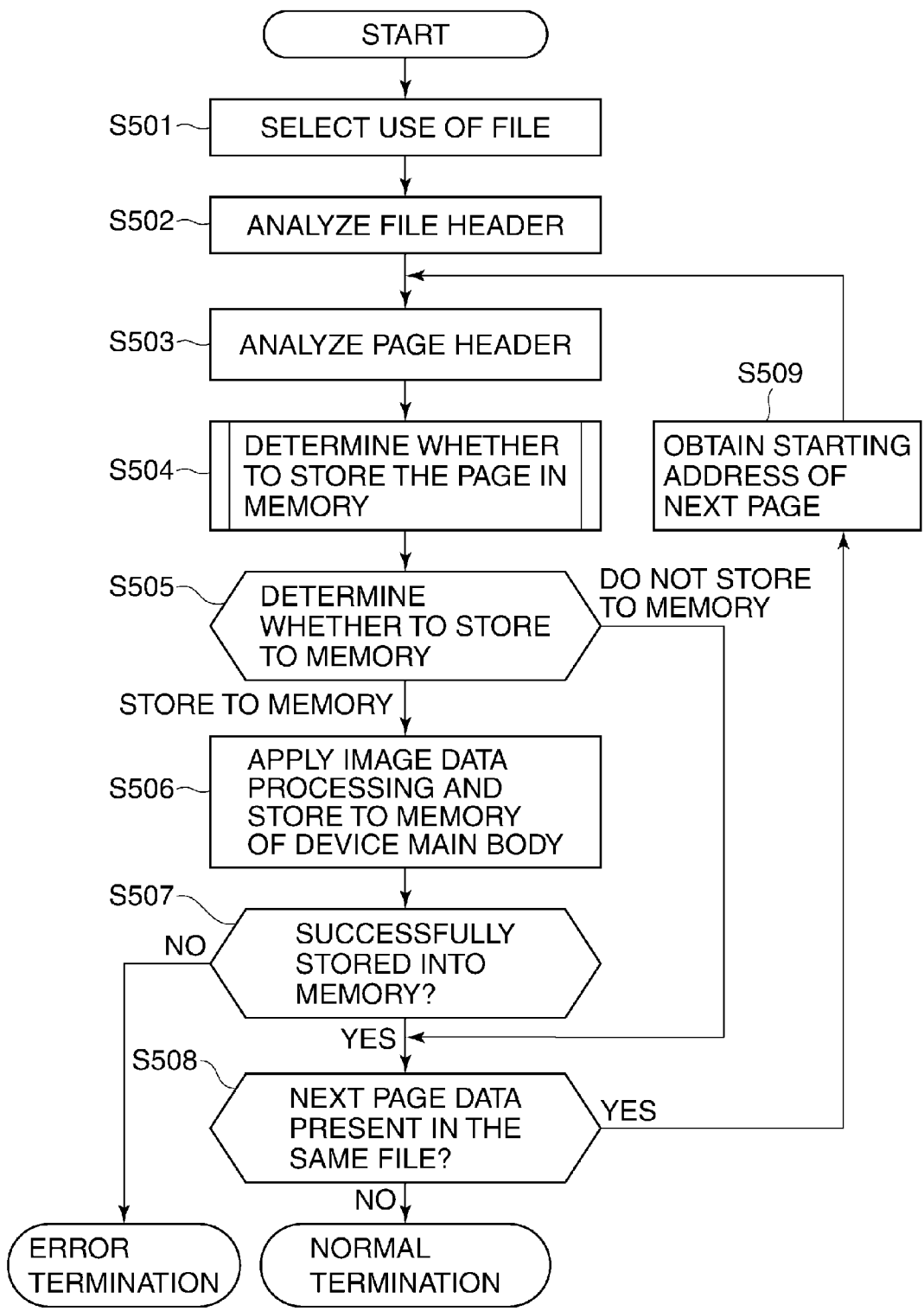

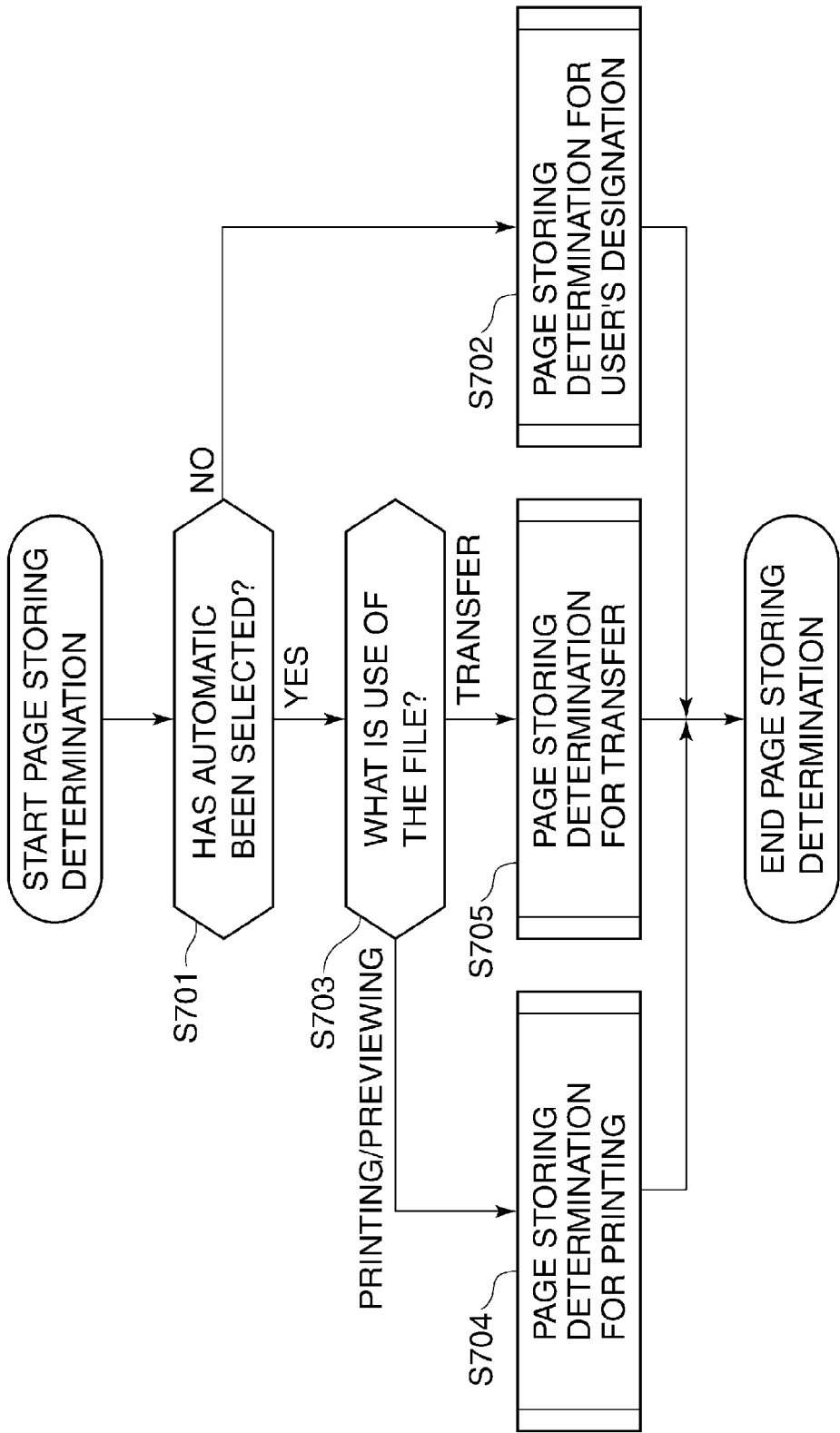

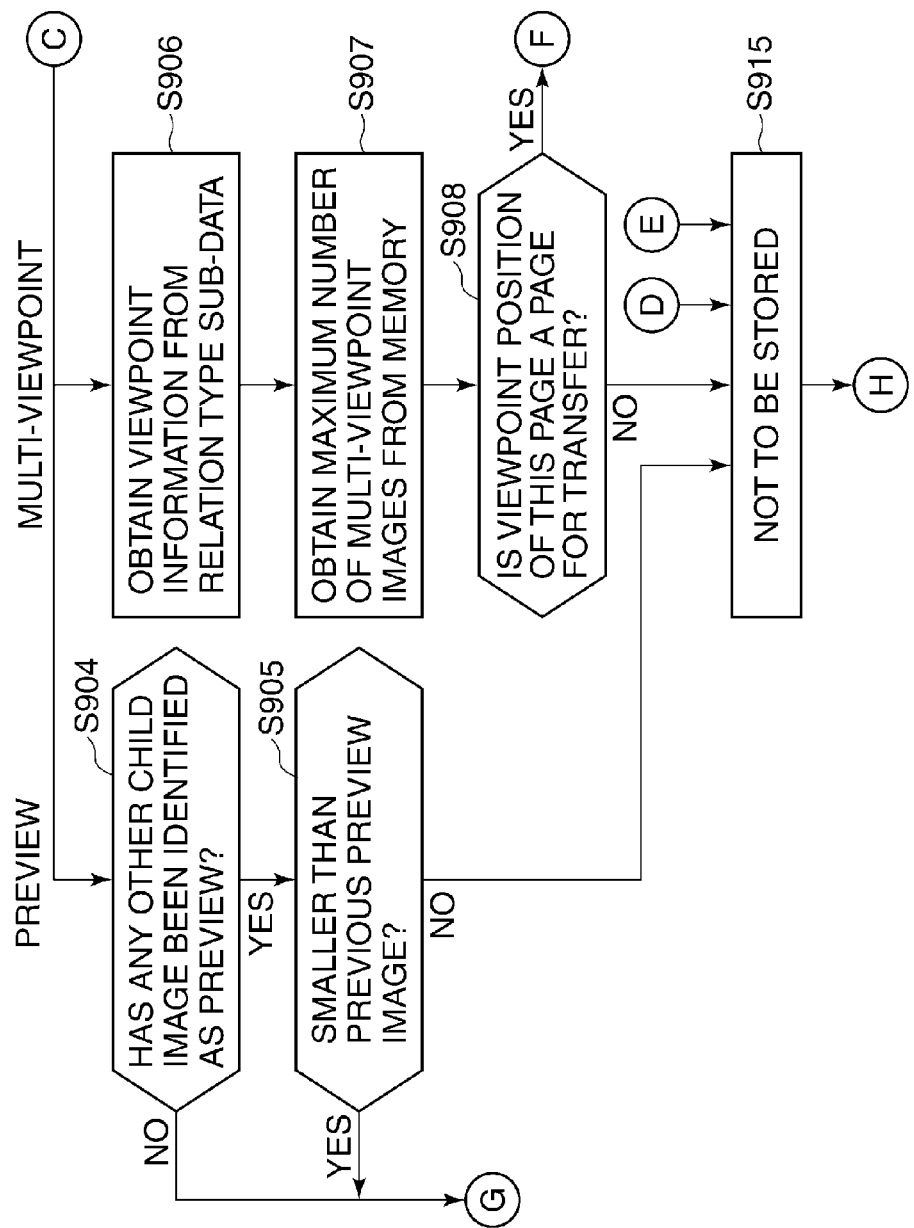

IMAGE PROCESSING APPARATUS, IMAGE PROCESSING METHOD, PROGRAM, AND STORAGE MEDIUM

This application is a U.S. National Phase Application of PCT International Application PCT/JP2009/063621 filed on Jul. 24, 2009 which is based on and claims priority from JP 2008-198560 filed on Jul. 31, 2008 the contents of which are incorporated herein by reference in their entirety.

TECHNICAL FIELD

The present invention relates to an image processing apparatus, an image processing method and a program which carry out image processing on image data and a readable storage medium for storing the program, and more particularly, to an image processing apparatus for executing image processing on individual pieces of image data contained in a file loaded from an external device.

BACKGROUND ART

As electronic devices equipped with memory of a large capacity, e.g., personal computers and image processing apparatuses, have become widely available in these years, it is now possible to use a file of a large data amount, such as a file containing high-resolution images or a file containing multiple images.

As a technique for improving convenience of such a large-capacity file, a technique has been proposed that speeds up access to image data in a file that contains a number of images (see the Patent Literature (PTL 1) below). This technique provides within a single file an image data area in which pieces of image data are sequentially stored and an amount-of-characteristic data area in which characteristic information of each piece of image data is stored, and fast access to desired image data is possible by referencing the amount-of-characteristic data area.

By the way, when image processing, e.g., printing processing, is applied to a file in an image processing apparatus, all data in the file is usually printed. Thus, when printing processing is applied to a file that contains multiple files, all image data in the file will be printed.

CITATION LIST

Patent Literature

{PTL 1} Japanese Laid-Open Patent Publication (Kokai) No. 2001-43239

SUMMARY OF INVENTION

Technical Problem

However, when printing processing is applied to a file that contains multiple pieces of image data that were continuously shot, for example, all the image data is printed even though the file contains a large quantity of similar image data that have little difference in composition from each other. This can lead to a problem of waste of electric power, memory, or the like associated with printing of images that have little significance in being printed, such as ones that have little difference in composition. This problem occurs not only in printing processing but in other ways of image processing, e.g., transfer of images.

The present invention provides an image processing apparatus, an image processing method, a program, and a readable storage medium for storing the program that prevent waste of electric power, memory or the like by selecting image data that is highly significant for image processing from multiple pieces of image data contained in a single file and subjecting the image data to image processing.

Solution to Problem

Accordingly, in a first aspect of the present invention, there is provided a reception unit which receives a file that contains multiple pieces of image data with attribute information added, a determination unit which determines whether or not a corresponding one of the pieces of image data is to be subjected to image processing based on the attribute information contained in the file received by the reception unit, and a control unit which provides control such that image data which has been determined to be subjected to image processing by the determination unit is stored in a storage section and image data that has not been determined to be subjected to image processing is not stored in the storage section.

Accordingly, in a second aspect of the present invention, there is provided an image processing method comprising a receiving step of receiving a file that contains multiple pieces of image data with attribute information added, a determination step of determining whether or not a corresponding one of the pieces of image data is to be subjected to image processing based on the attribute information contained in the file received in the receiving step, and a control step of providing control such that image data which has been determined to be subjected to image processing in the determination step is stored in a storage section and image data that has not been determined to be subjected to image processing is not stored in the storage section.

Accordingly, in a third aspect of the present invention, there is provided a program for causing a computer to execute an image processing method, the image processing method comprising a receiving step of receiving a file that contains multiple pieces of image data with attribute information added, a determination step of determining whether or not a corresponding one of the pieces of image data is to be subjected to image processing based on the attribute information contained in the file received the receiving step, and a control step of providing control such that image data which has been determined to be subjected to image processing in the determination step is stored in a storage section and image data that has not been determined to be subjected to image processing is not stored in the storage section.

Accordingly, in a fourth aspect of the present invention, there is provided a computer-readable storage medium having stored thereon the program.

Advantageous Effects of Invention

According to the present invention, since it is determined whether each of multiple images contained in a single file should be subjected to image processing or not based on attribute information, image processing can be applied only to image data that has been determined to be subjected to image processing and hence waste of electric power, memory or the like can be prevented.

The features and advantages of the invention will become more apparent from the following detailed description taken in conjunction with the accompanying drawings.

BRIEF DESCRIPTION OF DRAWINGS

FIG. 4 is a view showing a structure of the page header of FIG. 3;

FIG. 5 is a flowchart showing a procedure of image processing on a multi-page file executed on a multi-function machine;

FIG. 7 is a flowchart showing a procedure of a determination process in step S504 of FIG. 5;

FIG. 9B is a flowchart showing a procedure of a page storage determination process for transfer in step S705 of FIG. 7;

DESCRIPTION OF EMBODIMENTS

An embodiment of the present invention will be described with reference to drawings.

Figure 1:
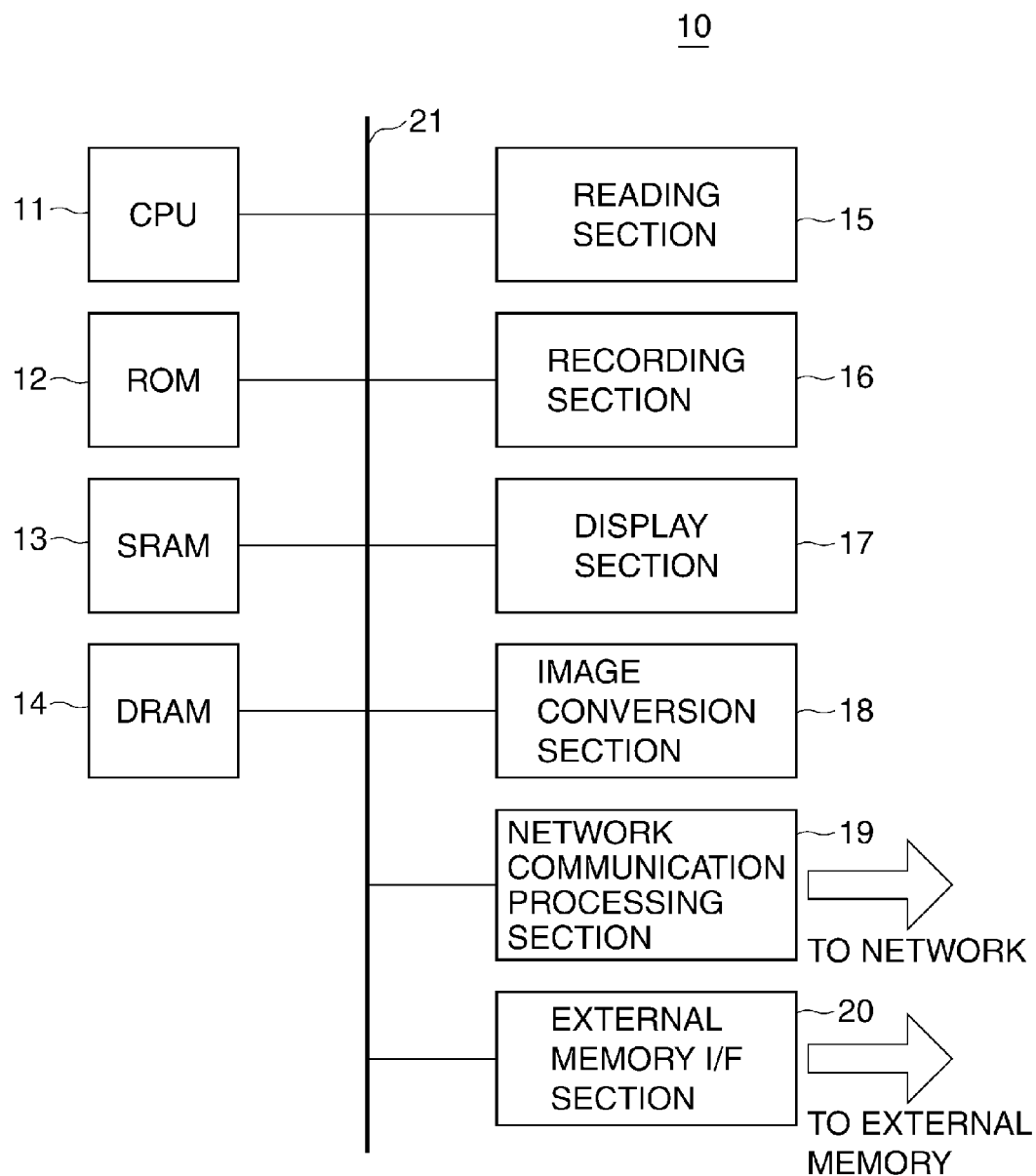
FIG. 1 is a block diagram schematically showing an overall configuration of an image processing apparatus according to an embodiment of the present invention.

FIG. 1 is a block diagram schematically showing an overall configuration of an image processing apparatus according to an embodiment of the present invention. The present embodiment shows a multi-function machine 10 that has functions of printing, reading, copying, file transfer and the like as the image processing apparatus.

In FIG. 1, the multi-function machine 10 is mainly composed of a CPU 11 (a determination unit), ROM 12, SRAM 13 (a storage unit), DRAM 14 (a storage unit), a reading section 15, a recording section 16, a display section 17, an image conversion section 18, a network communication processing section 19 (a reception unit), and an external memory I/F section 20 (a reception unit). The sections are interconnected via a system bus 21.

The CPU 11 (a control unit) serves as a control section for the system, controlling the entire multi-function machine according to a control program stored in the ROM 12. In the SRAM 13, setting values registered by a user, management data, buffers for various works and the like are stored, and in the DRAM 14, program control variables and the like are stored.

The reading section 15 reads image data and converts it to binary data. The recording section 16 outputs image data onto recording paper. The display section 17 is an interface with the user for displaying information in the device. The image conversion section 18 applies conversion processing such as encoding/integration to image data that has been either read or input. The network communication processing section 19 controls communication with a network line, and the external memory I/F section 20 controls communication with external memory such as a USB memory.

Now, image processing operations in the multi-function machine 10 will be described.

First, image processing operations performed when one piece of image data is input will be described.

In the multi-function machine 10, when image data is input via the network communication processing section 19 or the external memory I/F section 20, the data is once stored in the SRAM 13 or DRAM 14. The stored image data is subjected to conversion processing by the image conversion section 18. Conversion processing may be similarly applied to image data read by the reading section 15. Image data after conversion processing is also stored in the SRAM 13 or DRAM 14.

Then, by the recording section 16 outputting the image data stored in the SRAM 13 or DRAM 14 onto recording paper on the multi-function machine 10, printing processing as image processing is carried out. Also, on the multi-function machine 10, preview processing as image processing is carried out by the display section 17 previewing stored image data. Also, on the multi-function machine 10, transfer processing as image processing is carried out by the network communication processing section 19 or the external memory I/F section 20 outputting stored image data to a network or external memory, respectively.

Next, image processing operation performed when a file containing multiple pieces of image data (hereinafter referred to as a "multi-page file") is input will be described.

First, using FIGS. 2A to 4, a multi-page file is described.

FIGS. 2A, 2B, 2C and 2D show multi-page files formed through an image capturing process by an image capturing device. It should be noted that a file is shown on the right side of each of FIGS. 2A to 2D, and a method of shooting that formed the file is shown on the left side.

Figure 2A:
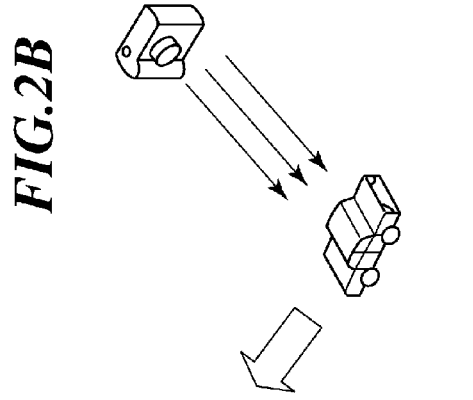
FIGS. 2A, 2B, 2C and 2D are diagrams showing arrangement of image data in a multi-page file that is formed through image capturing process of an image capturing device.

FIG. 2A shows a multi-page file that is composed of multiple images obtained by taking pictures of a particular subject from a number of viewpoints (hereinafter referred to as a "multi-viewpoint image"). This method of shooting takes pictures of a subject from various angles. In FIG. 2A, an image taken from the front is stored of the first page in the file as a parent image, and images taken at 45 degrees to the right and left are stored in the second and third pages of the file, respectively, as child images.

Figure 2B:
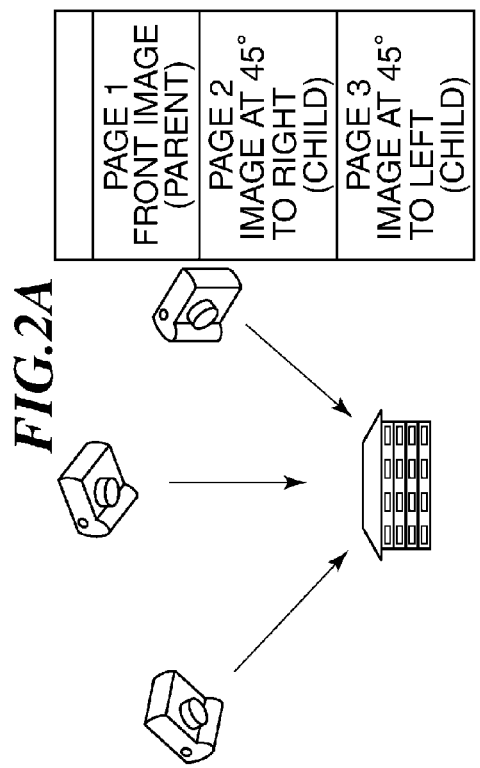

FIG. 2B shows a multi-page file that is composed of multiple images that were taken by continuously taking pictures of a particular subject (hereinafter referred to as a "continuously-shot image"). This method of shooting takes pictures of a moving subject successively at intervals of one second. In FIG. 2B, an image that was first taken is stored in the first page of the file as a parent image, and images that were taken one, two, and three seconds later are stored as child images in the second, third, and fourth page of the file, respectively.

Figure 2D:
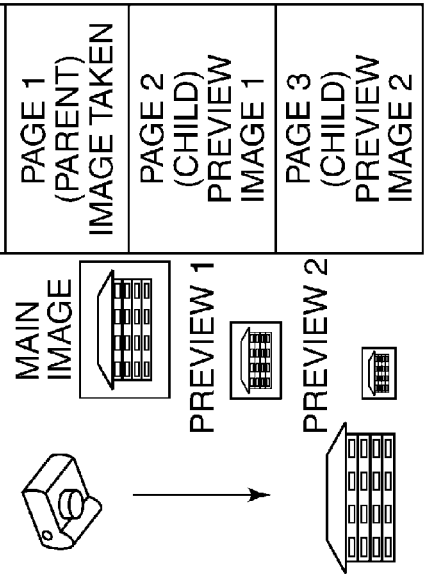
Figure 2C:
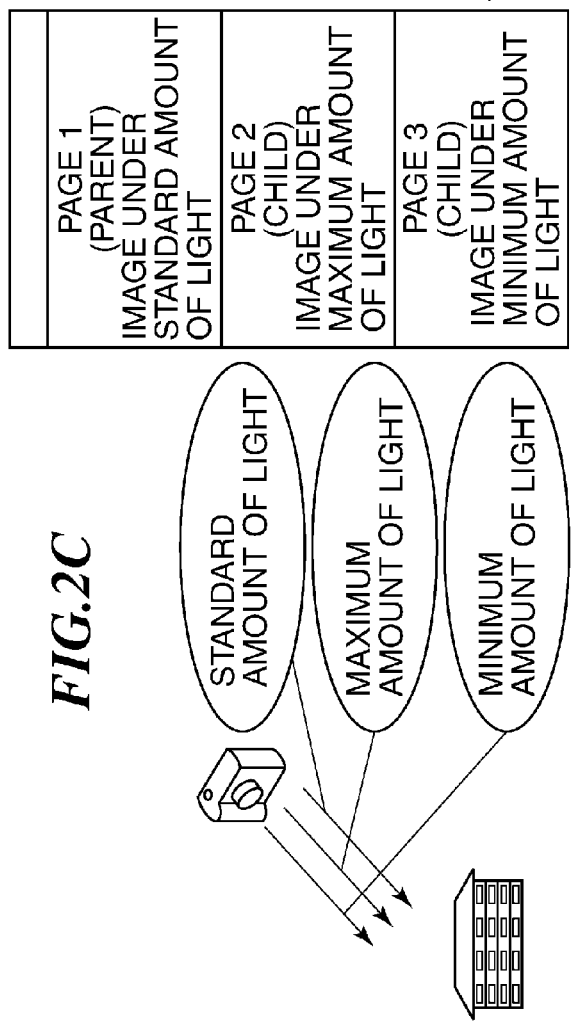

FIG. 2C shows a multi-page file composed of multiple images that are obtained by taking pictures of a particular subject under varying shooting conditions (hereinafter referred to as a "shooting condition varied image"). This method of shooting takes pictures of a subject sequentially changing conditions of picture taking, e.g., the amount of light. In FIG. 2C, an image that was taken under a standard amount of light is stored in the first page of the file as a parent image, and images that were taken under the maximum and minimum amounts of light are stored as child images in the second and third pages of the file, respectively.

FIG. 2D shows a multi-page file that is composed of multiple images obtained by changing the number of pixels of a single image taken (hereinafter referred to as a "preview image"). In FIG. 2D, an original image taken is stored in the first page of the file as a parent image, and preview images of gradually reduced numbers of pixels are stored as child images in the second and third pages of the file, respectively.

Figure 3:
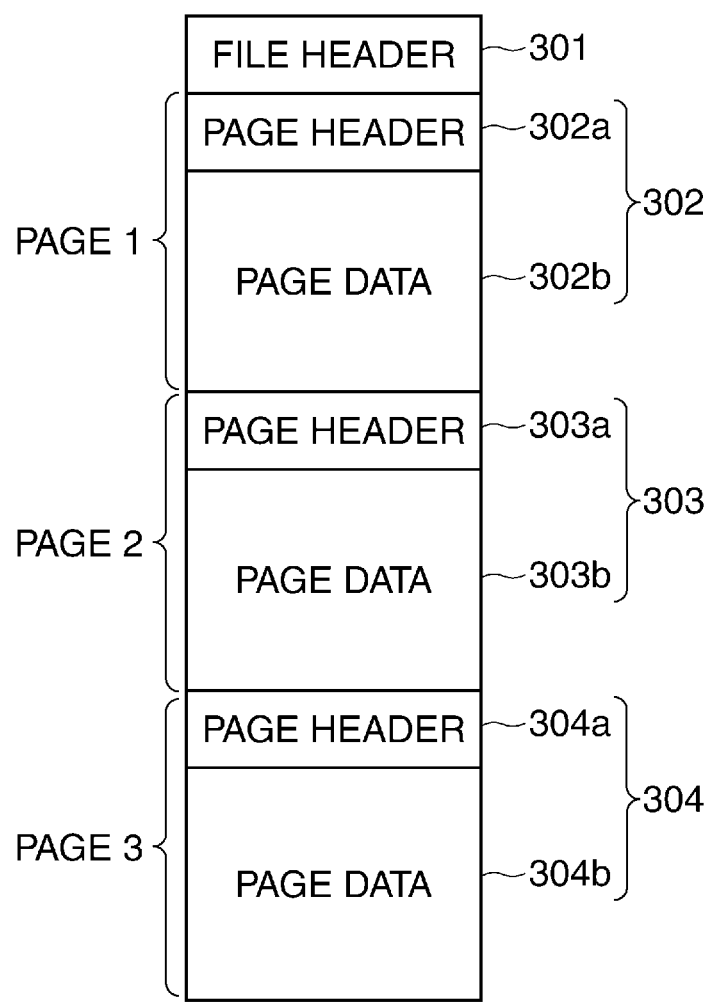
FIG. 3 is a view schematically showing a structure of a multi-page file.

FIG. 3 is a diagram schematically showing a structure of a multi-page file, and FIG. 4 is a diagram schematically showing a structure of the page header of FIG. 3.

In FIG. 3, a file header 301 is present at the beginning of a multi-page file 300 (in an upper portion in FIG. 3), and pages 302, 303 and 304 are present in sequence under the file header 301. At the beginning of the pages 302, 303 and 304, page headers 302a, 303a, and 304a are present, respectively, and following the page headers 302a, 303a, and 304a, there are page data 302b, 303b, and 304b, respectively.

In each page data, image data is stored, and in each page header, attribute information of each image data is stored. The multi-page file 300 is configured such that the address of the page header 302a in the first page can be obtained from the file header 301, and a corresponding page can be accessed by a page header being referenced in sequence from the beginning.

In FIG. 4, attribute information 401 stored in a page header includes parent image information 402 which shows whether the image data stored in the page data is a parent image or not, and child image information 403 which shows whether the image data is a child image or not. The parent image information 402 is configured to set a parent image flag, for example, when the image data is a parent image and the child image information 403 is configured to set a child image flag, for example, when the image data is a child image.

When the image data is a child image, the attribute information 401 further includes parent image source information 404 which shows a corresponding parent image, relation type information 405 showing which kind of child image the image data is with respect to the parent image, and relation type sub-data information 406 showing respective relation with the parent information.

For example, the parent image source information 404 is configured to show an ID of a corresponding parent image. The relation type information 405 is designed to show "0" when the image data is a preview image of the parent image, "1" when the image data is a continuously-shot image of the parent image, "2" when the image data is a shooting condition varied image of the parent image, and "3" when the data is a multi-viewpoint image of the parent image. The relation type sub-data information 406 is designed to show a page number of a continuously-shot image which indicates the order of a child image as counted from the parent image, or a value equivalent to change in amount of light from the parent image, for example.

As described above using FIGS. 2A to 4, a multi-page file often contains a number of child images for one parent image. When such a multi-page file is input to the multi-function machine 10, it is unlikely that the user wants all image data to be subjected to image processing. The user may desire image processing on only a parent image which is a main image, or only on child images that are significantly different in composition from the parent image, for example.

The multi-function machine 10 according to the present embodiment selects image data that will be subjected to image processing in a multi-page file based on attribute information of image data, stores the image data in the SRAM 13 or DRAM 14, and applies image processing only to the selected image data. Hereinafter, storage processing for selecting and storing image data to be subjected to image processing will be described using FIGS. 5 to 10.

Figure 6A:
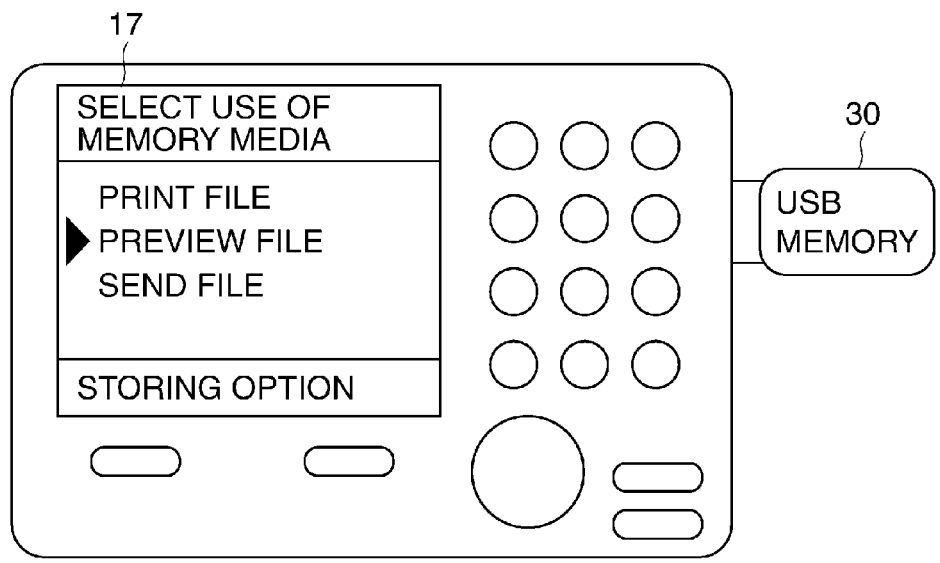
FIGS. 6A and 6B are diagrams showing display modes shown on a multi-function machine.

FIG. 5 is a flowchart showing a procedure of storage processing for a multi-page file that is executed on the multi-function machine 10. This processing is executed by the CPU 11 based on a program stored in the ROM 12. FIGS. 6A and 68 show display modes which are displayed on the multi-function machine 10 in the present processing.

In FIG. 5, when the user inserts a USB memory 30 in which a multi-page file is stored to the multi-function machine 10, a display shown in FIG. 6A first automatically appears on the display section 17. The display of FIG. 6A may also be designed to appear in response to the user's operation after inserting the USB memory 30.

On the display, the user is allowed to select from options of printing the multi-page file, displaying a preview of the multi-page file, and transmitting the multi-page file to other device, as image processing to be performed on the multi-page file. Once the user selects one of the options, the CPU 11 receives the result of the selection (step S501).

The user also can select an option of storage to memory. When memory storage option is selected, a display shown in FIG. 6B appears on the display section 17. The user is allowed to select from options of automatically storing images that have been determined to be subjected to image processing, storing all image data contained in the multi-page file, or storing only images identified as main images from the display. Once the user selects one of the storage methods, the CPU 11 receives the result of the selection (step S501). It should be noted that in the present embodiment, default setting is provided so that "automatic" is selected if the user does not explicitly select a method of storage.

The CPU 11, upon receiving the result of the selection of one of the options, performs file header analysis (step S502). The CPU 11 obtains the address of the page header in the first page through file header analysis and then analyzes the page header of the first page (step S503) (a receiving step).

Based on analysis of the page header of the first page, a determination process is conducted to determine whether page data contained in the first page should be stored in a memory or not (step S504) (a determination step). This determination process will be described later using FIGS. 9A to 11. From the result of the determination process, it is judged whether the first page should be stored in a memory of the device main body (step S505).

If a flag indicating storing to memory is set in step S505, image data processing is performed to encode the image data in the page and the image data is stored in a memory of the device main body—(step S506) (a storage step), and then the flow proceeds to step S507. In step S507, it is determined whether the image data of the first page was successfully stored. If it is determined that the data was not successfully stored, it is assumed that an error occurred, and the procedure is terminated with indication of an error. If it is determined that the data was successfully stored, the flow proceeds to step S508. On the other hand, when a flag indicating the image data should not be stored to memory is set, the data is not stored and the flow proceeds to step S508.

If in step S508 there is a page that follows the page for which determination was made in step S504 (YES in step S508), the address of the next page header is obtained from the current page header (step S509) and the flow returns to step S503, where analysis of the corresponding next page header is performed using the obtained address, and similar operations to those described above are carried out. The above-mentioned operations are repeated while a following page header is obtained, and when an address to a following page header is no longer obtained, it is assumed that required image pages have been stored in memory by executing determination for all image data contained in the file and the storage process is normally terminated.

After the normal termination, if "Print file", for example, is selected on the display of FIG. 6A in step S501, printing processing for the stored image data is carried out at the recording section 16 of the multi-function machine 10.

According to the process of FIG. 5, since only image data that has been determined to be subjected to image processing is stored among pieces of image data contained in a multi-page file, wasted execution of image processing on all image data can be prevented.

FIG. 7 is a flowchart showing a procedure of the determination process in step S504 of FIG. 5.

In FIG. 7, the CPU 11 first checks whether the user has explicitly selected a method of storage by selecting "Storage options" in step S501 (see FIG. 5) (step S701). If processing other than "Automatic" is selected in setting of the data storage options (see FIG. 6B), a page storage determination process is performed in accordance with the setting selected. The page storage determination process will be discussed later using FIG. 10.

Figure 6B:
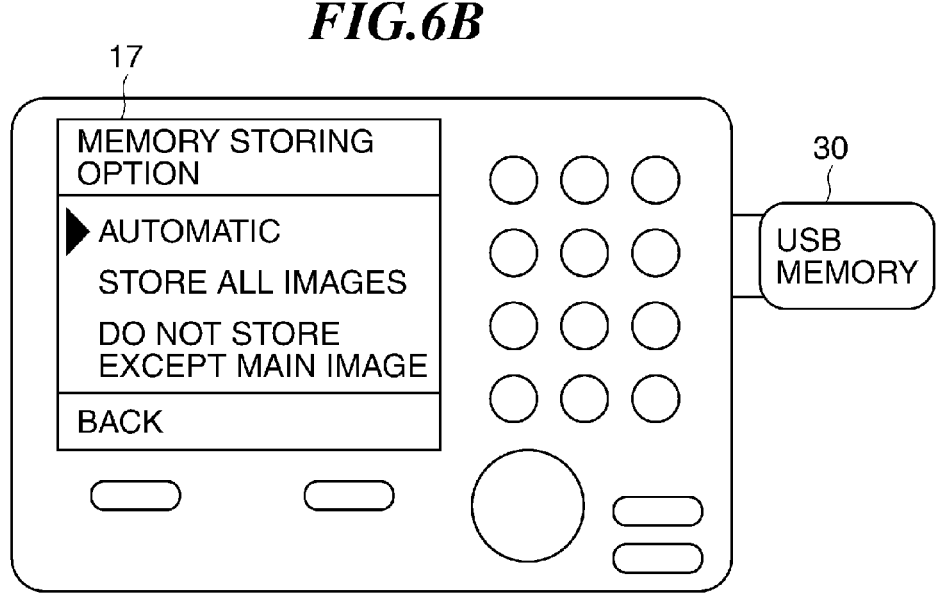

If "Automatic" is selected in setting of the data storage options, the CPU 11 checks which of printing, previewing, and transmission has been selected as image processing (step S703) (see FIG. 6B). If printing or previewing was selected as the purpose of using the multi-page file, a page storage determination process for printing is performed (step S704). If transmission was selected as the purpose of using the multi-page file, page storage determination process for transfer is performed (step S705).

Figure 8A:
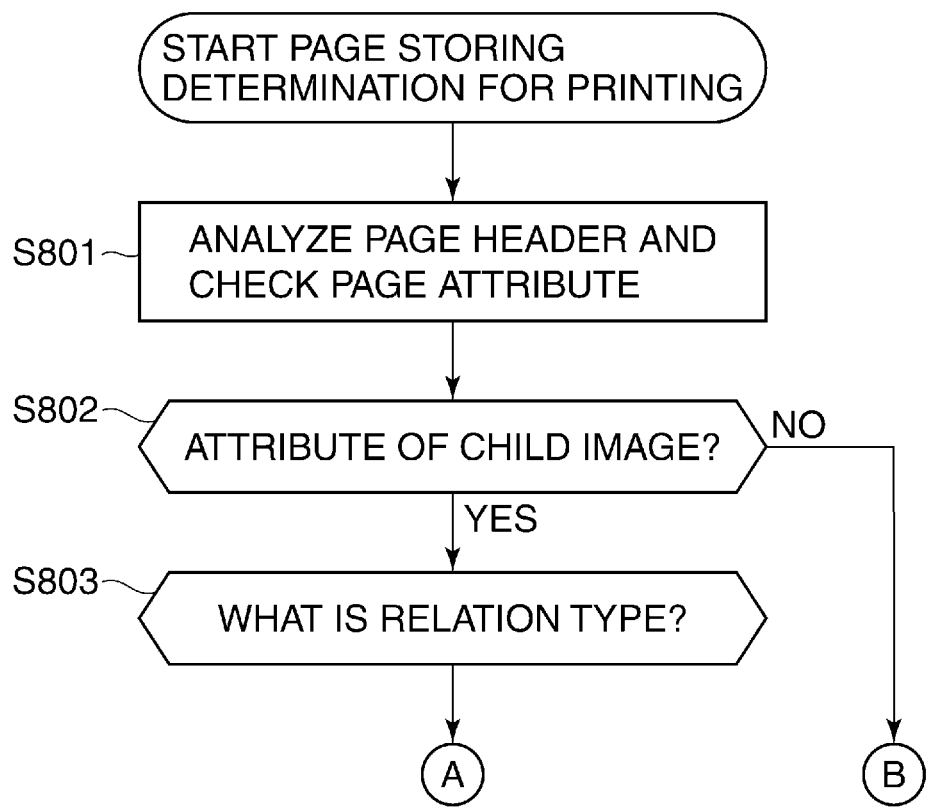
FIG. 8A is a flowchart showing a procedure of a page storage determination process for printing in step S704 of FIG. 7.
Figure 8B:
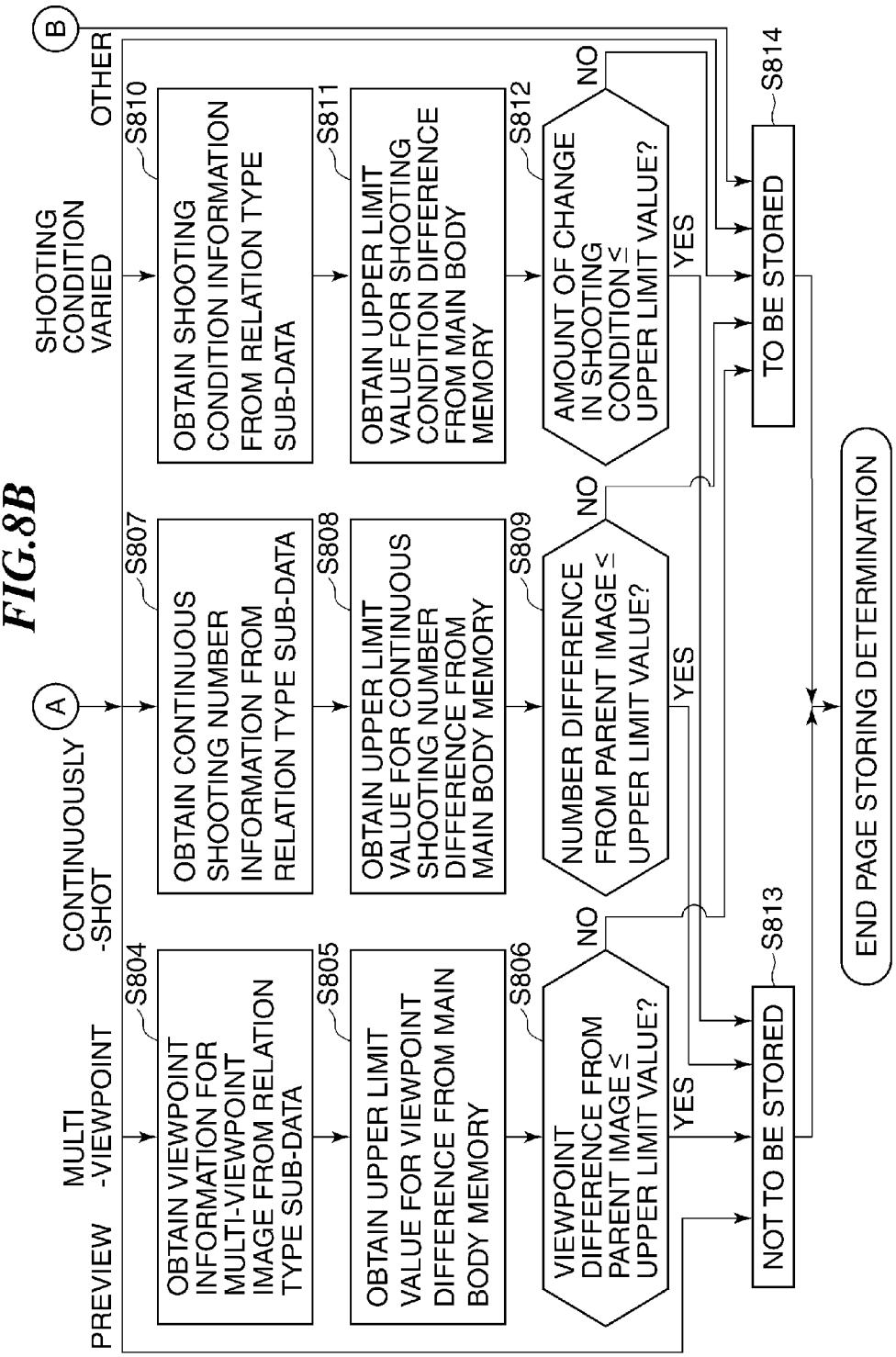
FIG. 8B is a flowchart showing a procedure of a page storage determination process for printing in step S704 of FIG. 7.

FIGS. 8A and 8B are a flowchart showing a procedure of the page storage determination process for printing performed in step S704 of FIG. 7.

In FIGS. 8A and 8B, the CPU 11 first obtains a page header and analyzes attribute information of corresponding image data (step S801), and based on the attribute information, judges whether the image data is a child image or not (step S802). If the image data is a parent image (NO in step S802), it is judged that the image is a main image in the multi-page file and should be subjected to image processing, and the image data is determined to be stored (step S814).

If the image data is a child image (YES in step S802), the CPU 11 analyzes relation type information to judge to which one of a preview image, multi-viewpoint image, continuously-shot image, shooting condition varied image, and other type of image the image data corresponds (step S803).

If the image data is a preview image in step S803, it is judged that the image data should not be subjected to printing processing and the image data is determined not to be stored (step S813).

If the image data is a multi-viewpoint image in step S803, viewpoint information is obtained from relation type sub-data information (step S804), and an upper limit value for viewpoint difference is obtained from the ROM 12 (step S805). Then, a viewpoint difference from the parent image is calculated from the viewpoint information, and the viewpoint difference from the calculated parent image is compared with the upper limit value obtained from the ROM 12 (step S806).

Here, the viewpoint difference represents the amount of change in shooting angle of a child image with respect to that of parent image. The upper limit value for viewpoint difference is a value prestored in the ROM 12, and is an index for judging whether or not image data as a child image differs from image data as its parent image due to change in shooting angle largely enough for judging that the child image is highly significant for printing.

When the shooting angle of the child image is different from that of the parent image just by, 10 degrees, for example, the composition of the image is almost the same as that of the parent image and there is little point in printing the image. Thus, the image should not be subjected to printing processing. On the other hand, when the shooting angle of the child image is different from that of the parent image by 90 degrees, for example, the image is significantly different in composition from the parent image and should be subjected to printing processing. The upper limit value for viewpoint difference as a predetermined upper limit serving as an index for judging whether image data should be subjected to printing processing or not may be arbitrarily set by the user.

If the viewpoint difference from the parent image is smaller than or equal to the upper limit value in step S806 (YES in S806), it is judged that the image should not be subjected to printing processing and the image is determined not to be stored (step S813). On the other hand, if the viewpoint difference from the parent image is larger than the upper limit value (NO in step S806), it is judged that the image should be subjected to printing processing and the image is determined to be stored (step S814).

If the image data is a continuously-shot image in step S803, continuous shooting number information is obtained from relation type sub-data information (step S807), and an upper limit value for continuous shooting number difference is obtained from the ROM 12 (step S808). Then, the continuous shooting number difference from the parent image is calculated from the continuous shooting number information, and the number difference from the parent image is compared with the upper limit value (step S809).

Here, the continuous shooting number is a consecutive number sequentially given to following image data starting with 2 assuming that the number 1 is given to a parent image that was first taken among continuously taken images, for example, and continuous shooting number difference indicates the order of shooting as counted from the parent image. The upper limit value for continuous shooting number difference is a value prestored in the ROM 12, and is an index used for judging whether or not the timing of shooting of image data as a child image is apart from that of image data as a parent image largely enough for judging that the child image is highly significant for printing. The larger the continuous shooting number difference becomes, the more the timing of shooting are apart from each other.

If the time at which the picture of the child image was taken is apart from that of the parent image only by, for example, 0.1 second, the composition of the child image is almost same as that of the parent image and there is little point in printing the image. Thus, the image should not be subjected to printing processing. On the other hand, if the time at which the picture of the child image was taken is apart from that of the parent image by 5 seconds, for example, the image is largely different in composition from the parent image and should be subjected to printing processing. The upper limit value for continuous shooting number difference as a predetermined condition serving as an index for judging whether image data should be subjected to printing processing or not may be arbitrarily set by the user.

If the continuous shooting number difference from the parent image is smaller than or equal to the upper limit value in step S809 (YES in step S809), it is judged that the image should not be subjected to printing processing and the image is determined not to be stored (step S813). On the other hand, if the continuous shooting number difference from the parent image is larger than the upper limit value (NO in step S809), it is judged that the image should be subjected to printing processing and the image is determined to be stored (step S814).

If the image data is a shooting condition varied image in step S803, shooting condition information is obtained from relation type sub-data information (step S810), and an upper limit value for shooting condition difference is obtained from the ROM 12 (step S811). Then, a shooting condition difference from the parent image is calculated from the shooting condition information, and the shooting condition difference from the parent image is compared with the upper limit value (step S812).

Here, the shooting condition difference represents the amount of change in shooting condition, e.g., the amount of light, of a child image with respect to that of the parent image. The upper limit value for shooting condition difference is a value prestored in the ROM 12, and is an index for judging whether or not image data as a child image is different from image data as a parent image due to change in shooting condition largely enough for judging that the image data as the child image is highly significant for printing.

When the shooting condition, e.g., the amount of light, of a child image is 1.2 times, for example, as large as that at the time at which the parent image was taken, the image quality of the image is almost the same as that of the parent image and there is little point in printing the image. Thus, the image should not be subjected to printing processing. On the other hand, if the amount of light at the time of taking the child image is five times as large as that of the parent image, the image has image quality largely different from that of the parent image and should be subjected to printing processing. The upper limit value for shooting condition difference as a predetermined condition serving as an index for judging whether image should be subjected to printing processing or not may be arbitrarily set by the user.

If the shooting condition difference from the parent image is smaller than or equal to the upper limit value in step S812 (YES in step S812), it is judged that the image should not be subjected to printing processing and the image is determined not to be stored (step S813). On the other hand, if the shooting condition difference from the parent image is larger than the upper limit value (NO in step S812), it is judged that the image should be subjected to printing processing and the image is determined to be stored (step S814).

If the image data is none of a preview image, multi-viewpoint image, continuously-shot image, or a shooting condition varied image in step S803, there is no index for judging whether the image is highly significant for printing. In this case, it is determined that the image is to be stored (step S814).

After determination of whether the image data should be stored or not, the page storage determination process is terminated and the flow proceeds to step S505 of FIG. 5.

According to the process of FIGS. 8A and 8B, it is possible to exclude a child image that has little difference in composition or image quality from its parent image from printing or preview processing, among child images that are preview images of a parent image as well as child images that are multi-viewpoint images, continuously-shot images, or shooting condition varied images of a parent image.

Figure 9A:
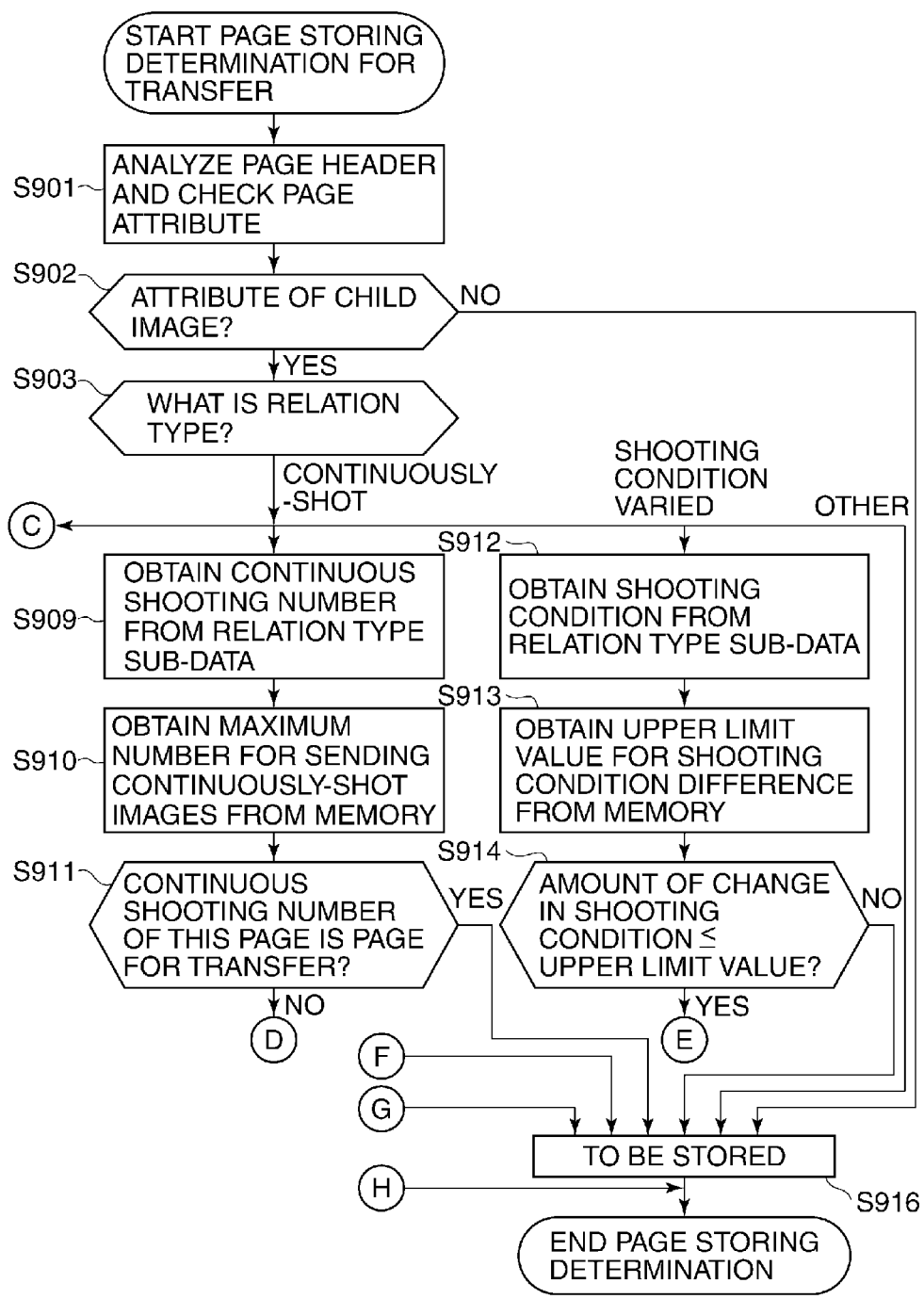
FIG. 9A is a flowchart showing a procedure of a page storage determination process for transfer in step S705 of FIG. 7.

FIGS. 9A and 9B are a flowchart showing a procedure of the page storage determination process for transfer in step S705 of FIG. 7.

In FIGS. 9A and 9B, the CPU 11 first obtains a page header and analyzes attribute information of corresponding image data (step S901), and based on the attribute information, judges whether or not the image data is a child image (step S902). If the image data is a parent image (NO in step S902), it is judged that the image is a main image in the file and should be transferred, and the image is determined to be stored (step S916).

If the image data is a child image (YES in step S902), the CPU 11 analyzes relation type information and judges to which one of a preview image, multi-viewpoint image, continuously-shot image, shooting condition varied image, and other type of image the image data corresponds (step S903).

If the image data is a preview image in step S903, it is checked whether any other child image having the same parent image has been already determined to be stored as a preview image or not (step S904). If no other preview image has been determined to be stored (NO in step S904), the CPU 11 judges that the image data is necessary as a preview image and should be stored (step S916).

On the other hand, if other preview image has been determined to be stored (YES in step S904), the CPU 11 determines whether the size of the image data is smaller than that of the image data that has been already determined to be stored (step S905). If the image data is smaller in size than the image data already determined to be stored (YES in step S905), it is judged that the image data is suited for transfer and the image data is determined to be stored (step S916). It should be noted that in this case, the image data that was previously determined to be stored is not stored. If the size is larger than or equal to that of the image data that has been already determined to be stored (YES in step S905), it is judged that the image data is not to be stored (step S915).

If the image data is a multi-viewpoint image in step S903, viewpoint information is obtained from relation type sub-data information (step S906). From the viewpoint information, the number of pages of child images having the same parent image is analyzed, and the order of shooting of a child image to which the image data corresponds as counted from the parent image is calculated. Then, the maximum number of multi-viewpoint images to be transferred is obtained from the ROM 12 (step S907), and based on the maximum number, it is determined whether the image data is image data that should be transferred or not (step S908).

Here, the maximum number of multi-viewpoint images to be transferred when sending multi-viewpoint images is a value indicating the number of child images to be transferred when child images having the same parent image are multi-viewpoint images. By way of example, assume that there are 100 pages of child images that were sequentially taken at an angle that varies in increments of one degree from the shooting angle of the parent image and the value indicating the maximum number is 10. In this case, it is—determined that a total of ten pages of image data that differ in shooting angle from that of the parent image by 10, 20, 30, . . . , and 100 degrees are image data that should be transferred.

If it is judged that the image data should be transferred in step S908 (YES in step S908), the image data is determined to be stored (S916), and if it is determined that the image data should not be transferred (NO in step S908), the image data is determined not to be stored (step S915).

If the image data is a continuously-shot image in step S903, continuous shooting number information is obtained from relation type sub-data information (step S910). From the continuous shooting number information, the number of pages of child images having the same parent image is analyzed, and the order of shooting of a child image to which the image data corresponds as counted from the parent image is calculated (step S809). Then, the maximum number of continuously-shot images to be transferred is obtained from the ROM 12 (step S808), and based on the maximum number, it is determined whether the image data is image data that should be transferred or not (step S911).

Here, the maximum number of continuously-shot images to be transferred is a value indicating the number of child images to be transferred when child images group having the same parent image are continuously-shot images. By way of example, assume that there are 100 pages of child images that were sequentially taken with a delay in increments of one second from the time when the parent image was taken and the value indicating the maximum number is 10. In this case, it is determined that a total of ten pages of image data that were taken 10, 20, 30, . . . , and 100 seconds after when the parent image was taken are image data that should be transferred.

If it is judged that the image data should be transferred in step S911 (YES in step S911), the image data is judged to be stored (step S916), and if it is determined that the image data should not be transferred (NO in step S911), the image data is determined not to be stored (step S915).

By the way, when image data is a shooting condition varied image, an image whose shooting condition is significantly different from that of the parent image is often better transferred as a separate image because a vast number of images are seldom present as in the case of multi-viewpoint or continuously-shot images.

Therefore, if the image data is a shooting condition varied image in step S903, shooting condition information is obtained from relation type sub-data information (step S912), and an upper limit value for shooting condition difference is obtained from the ROM 12 (step S913). Then, the shooting condition difference from the parent image is calculated from the shooting condition information, and the shooting condition difference from the parent image is compared with the upper limit value (step S914). It should be noted that the shooting condition difference and the upper limit value therefor are the same as those described above.

If the shooting condition difference from the parent image is smaller than or equal to the upper limit value in step S914 (YES in step S914), it is judged that the image data should not be transferred and the image data is determined not to be stored (step S915). On the other hand, if the shooting condition difference from the parent image is larger than the upper limit value (NO in step S914), it is determined that the image data should be transferred and the image data is determined to be stored (step S916).

If the image data is none of a preview image, a multi-viewpoint image, a continuously-shot image, or a shooting condition varied image in step S903, there is no index upon which to judge whether the image data should be printed or not. In this case, it is judged that the image data should be transferred and the image data is determined to be stored (step S916).

After determination of whether the image data is to be stored or not, the page storage determination process is terminated and the flow proceeds to step S505 of FIG. 5.

According to the process of FIGS. 9A and 9B, it is possible to select a preview image of a small number of pixels as a subject of transfer processing. It is also possible to discretely select child images that are multi-viewpoint or continuously-shot images and select image data that has large difference in image quality as compared with that of parent image among child images that are shooting condition varied images. It should be noted that a criterion for selecting child images as subjects of storing may also be changed by a user as necessary. For example, the criterion may be to select preview images of a large number of pixels or first several pages of child images that are multi-viewpoint or continuously-shot images. In that case, child images to be stored are selected according to the arbitrarily defined criterion.

Next, processing for when "Automatic" is not selected in step S701 of FIG. 7 will be described using FIG. 10.

Figure 10:
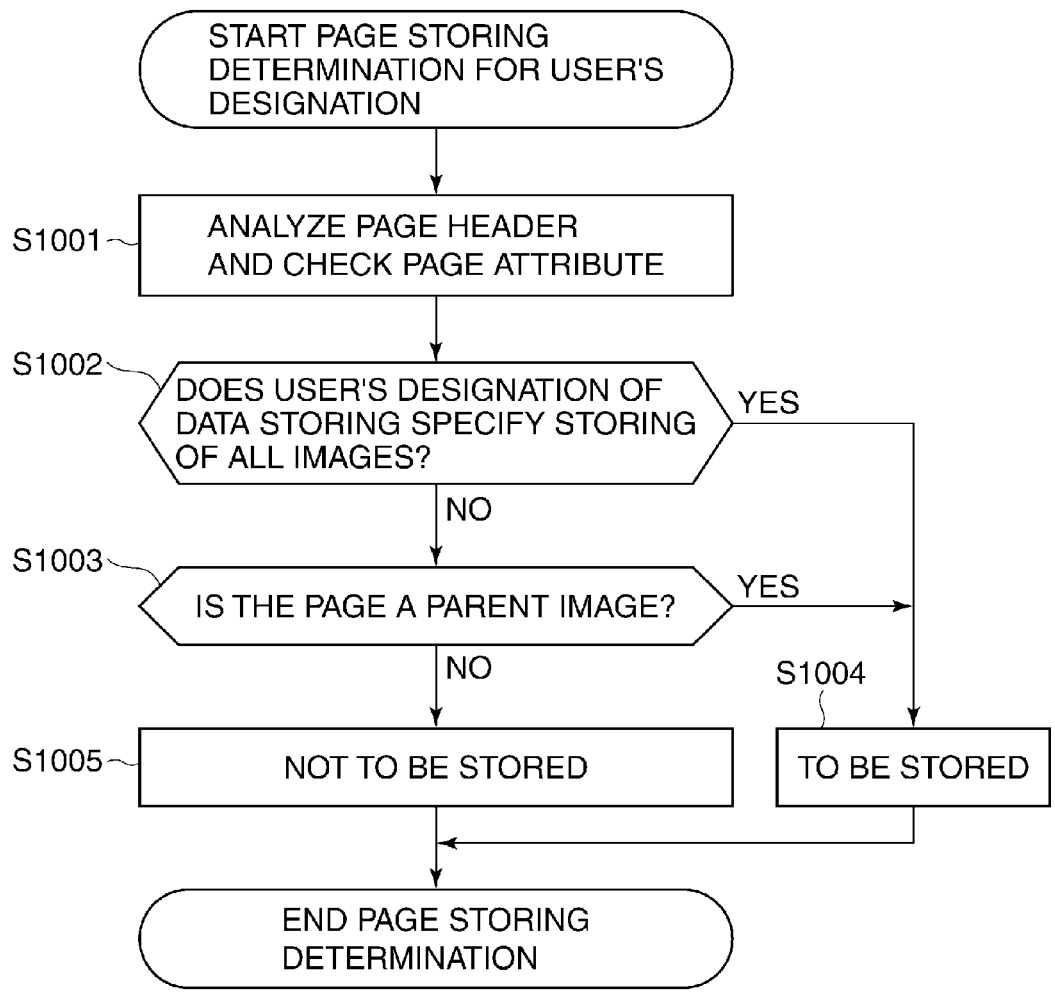
FIG. 10 is a flowchart showing a procedure of a page storage determination process started in response to user's designation in step S702 of FIG. 7.

FIG. 10 is a flowchart showing a procedure of a page storage determination process for the user's designation in step S702 of FIG. 7, showing a procedure of storing processing performed when the user explicitly designates a method of storing in the data storage option.

In FIG. 10, the CPU 11 first obtains a page header and acquires and analyzes attribute information of corresponding image data (step S1001). Then, the CPU 11 judges whether the user has selected storing of all images or storing of only a main image (step S1002) (see FIG. 6B).

If storage of all images is selected (YES in step S1002), it is determined that the page should be stored regardless of the analyzed attribute information (step S1004). If storage of only a main image is selected (NO in step S1002), it is determined whether the image data is a child image or not based on the analyzed attribute information (step S1003).

If the image data is a parent image (YES in step S1003), it is judged that the image is a main image in the file and should be subjected to image processing, and the image is determined to be stored (step S1004). On the other hand, if the image data is a child image (NO in step S1003), it is judged that the image data should not be subjected to image processing and the image is determined not to be stored (step S1005).

After determination of whether the image data should be stored or not, the page storing determination process is terminated and the flow proceeds to step S505 of FIG. 5.

According to the process of FIG. 10, when the user explicitly designates a method of storage, storage processing can be performed in accordance with that method.

Figure 11:
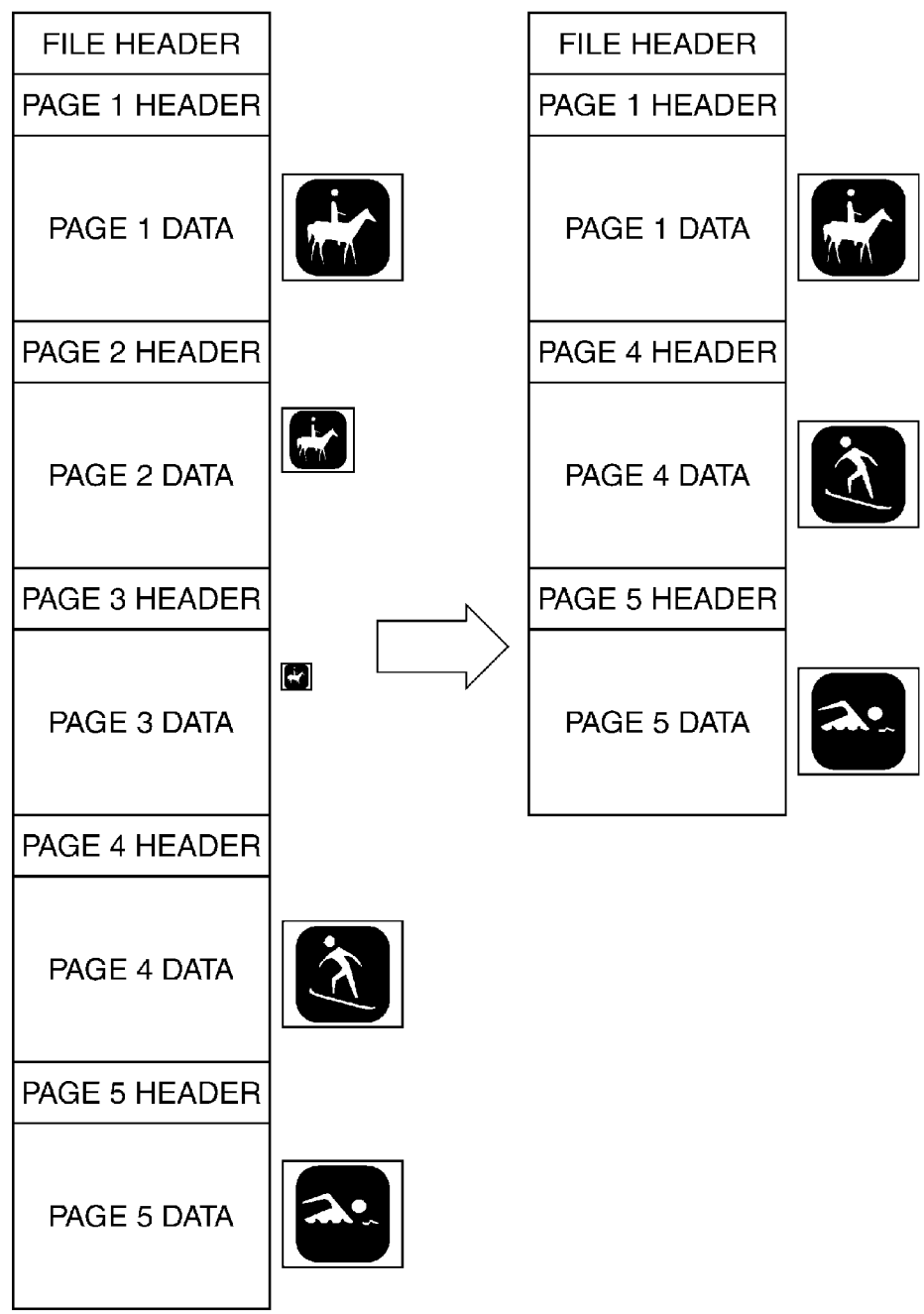
FIG. 11 is a diagram showing change in structure of a multi-page file caused by the present processing.

In the present embodiment, when printing processing is applied to a multi-page file shown on the left side in FIG. 11 that consists of five pages, for example, pages 1, 4 and 5 that are parent images are stored in the multi-function machine 10 as subjects of printing processing and pages 2 and 3 that are preview images are not stored. Therefore, the multi-page file consisting of five pages is stored on the multi-function machine 10 as a file that consists of the three pages which are selected parent images shown on the right side of FIG. 11, and the three-page file will be subjected to printing processing.

This can prevent waste of memory and also prevent image processing on pages that have little significance in being printed for the user because image processing is applied only to pages that have been determined to be processed and are stored, and also image processing time can be shortened.

As described, according to the present embodiment, when the multi-function machine 10 performs printing or previewing processing, child images that are preview images of a parent image are not subjected to image processing and are not stored in memory of the multi-function machine 10. Likewise, among child images that are multi-viewpoint images of a parent image, images that have little significance in being printed, namely child images that are not largely different in composition from that of parent image, are not subjected to image processing and not stored in memory of the multi-function machine 10. This also applies to child images that are continuously-shot images and ones that are shooting condition varied images. Thus, since printing or previewing processing is applied only to a parent image and child images that are highly significant for printing, waste of electric power, memory or the like can be prevented and only child images that are considered to be valuable for the user can be transferred.

In addition, when the multi-function machine 10 performs transfer processing and child images are preview images, preview images having a large number of pixels among the child images are not subjected to transfer processing and are not stored in memory of the multi-function machine 10. This can prevent transfer of preview images of a large size and thus reduce the amount of data that flows on a communication line at the time of transfer, which can prevent waste of electric power, memory or the like. Also, only child images that are considered to be valuable for the user can be transferred.

Furthermore, when the multi-function machine 10 performs transfer processing and child images are comprised of multi-viewpoint images or continuously-shot images, numbers are given to respective child images in order of closeness in composition to the parent image such that the given numbers are sorted to increase with equal intervals, some of the child images corresponding to the maximum transfer number are selected in order of the given numbers, and the selected child images are stored as subjects of transfer processing. Shooting condition varied images are selected and stored according to a similar method as the one used for printing processing. Thus, since transfer processing is applied only to a parent image and child images that are highly significant for transferring, waste of electric power, memory and the like can be prevented and only child images that are considered to be valuable for the user can be transferred.

In addition, the selection method used in transfer processing on child images that are multi-viewpoint images or continuously-shot images of a parent image may be applied to a case where the multi-function machine 10 performs printing processing. In that case, waste of electric power, memory or the like can be also prevented and, furthermore, only child images that are considered to be valuable for the user can be transferred.

Also, according to the present embodiment, when the user explicitly designates a method of storing, storing processing can be performed in accordance with that method.

It should be noted that the present embodiment is not limited to a file of TIFF format, for instance, and is applicable to all file formats that have files including multiple pages. Also, attribute information given to each piece of image data in a multi-page file is not limited to the attribute information described in the present embodiment and various types of information may be given.

The present invention can also be realized by supplying a system or an apparatus with a storage medium in which a program code of software that realizes the functions of the above-described embodiment is stored, and causing a computer (or a CPU, MPU, or the like) of the system or apparatus to read out and execute the program codes stored in storage medium.

In this case, the program code itself read from the storage medium realizes the functions of the above-described embodiment, and hence the program code and the storage medium in which the program code is stored constitute the present invention.

Examples of the storage medium for supplying the program code include a floppy (a registered trademark) disk, a hard disk, a magneto-optical disk, an optical disk such as a CD-ROM, CD-R, and CD-RW, a DVD-ROM, DVD-RAM, DVD-RW, DVD+RW, magnetic tape, non-volatile memory card, and a ROM. Alternatively, the program code may be downloaded via a network.

Further, it is to be understood that the above-described embodiment may be accomplished not only by executing a program code read out by a computer but also by causing an Operating System (OS) or the like which operates in the computer to perform a part or all of actual operations based on instructions of the program code.

Further, it is to be understood that the functions of the above-described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of actual operations of the expansion function based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-198560 filed Jul. 31, 2008, which is hereby incorporated by reference herein in its entirety.

DESCRIPTION OF SYMBOLS 10 multi-function machine
11 CPU
12 ROM
13 SRAM
14 DRAM
300 multi-page file
301 file header
302a, 303a, 304a page header
102c attribute information

The invention claimed is:

1. An image processing apparatus, comprising:
a reception unit adapted to receive a file that contains multiple pieces of image data with attribute information added;
a determination unit adapted to determine whether or not a corresponding one of the pieces of image data is to be subjected to image processing based on the attribute information contained in the file received by said reception unit; and
an image processing unit adapted to process the image data that has been determined to be subjected to image processing,
wherein said determination unit determines, if information indicating that the image data is an image for previewing is included in the attribute information added to the image data, that the image data is not to be subjected to image processing.

2. An image processing apparatus according to claim 1, wherein said determination unit determines that the image data is to be subjected to image processing if information indicating that the image data is a parent image is included in the attribute information.

3. An image processing apparatus according to claim 1, wherein said determination unit determines that the image data is to be subjected to image processing when information indicating that the image data is a child image that satisfies a predetermined condition is included in the attribute information.

4. An image processing apparatus according to claim 3, wherein the predetermined condition is set based on a shooting condition.

5. An image processing apparatus according to claim 1, wherein the multiple pieces of image data are multiple pieces of image data that are of different types with respect to one image, and the attribute information includes information indicating the types.

6. An image processing apparatus according to claim 5, wherein the types include information indicating that an image is an image for previewing.

7. An image processing apparatus according to claim 1, wherein the multiple pieces of image data are multiple pieces of image data that result from taking pictures of one subject, and the attribute information includes information indicating details of picture taking.

8. An image processing apparatus according to claim 7, wherein the details of picture taking include one of continuously shooting, change in shooting environment, and multi-viewpoint.

9. An image processing apparatus according to claim 1, further comprising a control unit adapted to provide control such that image data which has been determined to be subjected to image processing in said determination unit is stored in a storage section and image data that has not been determined to be subjected to image processing is not stored in the storage section.

10. An image processing apparatus according to claim 1, wherein said image processing unit applies at least any one of printing processing of printing the image data, transmitting processing of transmitting the image data to an external device, and displaying processing of displaying the image data.

11. An image processing method, comprising:
a receiving step of receiving a file that contains multiple pieces of image data with attribute information added;
a determination step of determining whether or not a corresponding one of the pieces of image data is to be subjected to image processing based on the attribute information contained in the file received in said receiving step; and
an image processing step of processing the image data that has been determined to be subjected to image processing,
wherein said determination step determines, if information indicating that the image data is an image for previewing is included in the attribute information added to the image data, that the image data is not to be subjected to image processing.

12. A non-transitory computer readable storage medium storing a program that, when executed by a computer, causes the computer to execute an image processing method, the image processing method comprising:
a receiving step of receiving a file that contains multiple pieces of image data with attribute information added;
a determination step of determining whether or not a corresponding one of the pieces of image data is to be subjected to image processing based on the attribute information contained in the file received in said receiving step; and
an image processing step of processing the image data that has been determined to be subjected to image processing,
wherein said determination step determines, if information indicating that the image data is an image for previewing is included in the attribute information added to the image data, that the image data is not to be subjected to image processing.

13. An image processing apparatus, comprising:
a reception unit adapted to receive a file that contains multiple pieces of image data with attribute information added;
a determination unit adapted to determine whether or not a corresponding one of the pieces of image data is to be subjected to image processing based on the attribute information contained in the file received by said reception unit; and
an image processing unit adapted to process the image data that has been determined to be subjected to image processing,
wherein said determination unit determines, if information indicating that the image data is a child image is included in the attribution information added to the image data, whether or not the image data is to be subjected to image processing based on relation type information showing relation with a parent image.

* * * * *